(12) United States Patent
Kuwamura et al.

(10) Patent No.: US 10,316,680 B2
(45) Date of Patent: Jun. 11, 2019

(54) TURBINE

(71) Applicant: MITSUBISHI HITACHI POWER SYSTEMS, LTD., Yokohama-shi, Kanagawa (JP)

(72) Inventors: Yoshihiro Kuwamura, Tokyo (JP); Hiroharu Oyama, Yokohama (JP); Yoshinori Tanaka, Yokohama (JP); Hideaki Sugishita, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 133 days.

(21) Appl. No.: 15/545,819

(22) PCT Filed: Dec. 16, 2015

(86) PCT No.: PCT/JP2015/085210
§ 371 (c)(1),
(2) Date: Jul. 24, 2017

(87) PCT Pub. No.: WO2016/121259
PCT Pub. Date: Aug. 4, 2016

(65) Prior Publication Data
US 2018/0016928 A1   Jan. 18, 2018

(30) Foreign Application Priority Data
Jan. 27, 2015   (JP) .................................. 2015-013138

(51) Int. Cl.
*F01D 11/00*   (2006.01)
*F01D 11/02*   (2006.01)
(Continued)

(52) U.S. Cl.
CPC ................ *F01D 11/02* (2013.01); *F01D 5/02* (2013.01); *F01D 9/041* (2013.01);
(Continued)

(58) Field of Classification Search
CPC . F01D 11/02; F01D 5/02; F01D 9/041; F01D 5/225; F05D 2220/31; F05D 2220/32; F05D 2240/127; F05D 2240/55
See application file for complete search history.

(56) References Cited

U.S. PATENT DOCUMENTS

| 4,420,161 A | 12/1983 | Miller |
| 4,466,772 A * | 8/1984 | Okapuu ................. F01D 11/08 415/171.1 |

(Continued)

FOREIGN PATENT DOCUMENTS

| JP | 55-159366 A | 12/1980 |
| JP | 58-222902 A | 12/1983 |

(Continued)

OTHER PUBLICATIONS

Office Action dated May 11, 2018 issued in counterpart Korean application No. 10-2017-7020708 with English translation. (12 pages).

(Continued)

*Primary Examiner* — Thomas N Moulis
(74) *Attorney, Agent, or Firm* — Westerman, Hattori, Daniels & Adrian, LLP

(57) ABSTRACT

A turbine is provided with a seal device. The seal device includes: at least one step surface disposed in a region of an outer peripheral surface of a rotor facing a shroud of a stationary vane in the radial direction of the rotor, the at least one step surface facing upstream in a flow direction of the fluid and dividing the region of the outer peripheral surface into at least two sections in an axial direction of the rotor: at least two seal fins protruding toward the at least two sections from the stationary vane and facing the at least two sections via a seal gap; and a swirling-component application portion disposed on an end side of the shroud of the stationary vane (Continued)

with respect to the axial direction of the rotor and configured to be capable of applying a swirling component to the fluid flowing toward the seal gap.

13 Claims, 5 Drawing Sheets

(51) Int. Cl.
   *F16J 15/447* (2006.01)
   *F01D 5/02* (2006.01)
   *F01D 9/04* (2006.01)
   *F01D 5/22* (2006.01)

(52) U.S. Cl.
   CPC .......... *F16J 15/4472* (2013.01); *F01D 5/225* (2013.01); *F05D 2220/31* (2013.01); *F05D 2220/32* (2013.01); *F05D 2240/127* (2013.01); *F05D 2240/55* (2013.01); *F05D 2250/314* (2013.01); *F05D 2250/71* (2013.01); *F16J 15/447* (2013.01)

(56) References Cited

U.S. PATENT DOCUMENTS

| | | | | |
|---|---|---|---|---|
| 4,662,820 | A * | 5/1987 | Sasada | F04D 29/161 415/173.6 |
| 5,639,095 | A * | 6/1997 | Rhode | F16J 15/4472 277/303 |
| 9,551,224 | B2 | 1/2017 | Onishi et al. | |
| 9,631,510 | B2 * | 4/2017 | Lim | F02C 7/28 |
| 2009/0072487 | A1 * | 3/2009 | Chougule | F01D 11/001 277/412 |
| 2011/0002777 | A1 * | 1/2011 | Smith | F01D 5/225 415/176 |
| 2011/0236189 | A1 * | 9/2011 | Ono | F01D 11/005 415/174.5 |
| 2012/0121393 | A1 | 5/2012 | Kuwamura et al. | |
| 2012/0288360 | A1 * | 11/2012 | Kuwamura | F01D 5/225 415/173.1 |
| 2013/0129493 | A1 * | 5/2013 | Matsumoto | F01D 5/225 415/191 |
| 2013/0149118 | A1 * | 6/2013 | Lotfi | F01D 11/02 415/174.5 |
| 2013/0189087 | A1 | 7/2013 | Spracher et al. | |
| 2013/0251534 | A1 * | 9/2013 | Matsumoto | F01D 5/147 416/223 R |
| 2013/0272855 | A1 * | 10/2013 | Kuwamura | F01D 11/10 415/173.5 |
| 2014/0154061 | A1 | 6/2014 | Kuwamura et al. | |
| 2014/0205443 | A1 * | 7/2014 | Lee | F01D 11/001 415/170.1 |
| 2015/0098809 | A1 * | 4/2015 | Ramm | F01D 11/12 415/173.6 |
| 2016/0130965 | A1 * | 5/2016 | Yamaguchi | F01D 1/04 415/13 |
| 2016/0333714 | A1 * | 11/2016 | Matsumoto | F01D 11/08 |
| 2017/0022838 | A1 * | 1/2017 | Kuwamura | F01D 11/02 |
| 2018/0058232 | A1 * | 3/2018 | Oikawa | F01D 5/02 |
| 2018/0355743 | A1 * | 12/2018 | Nishikawa | F01D 5/20 |
| 2018/0355979 | A1 * | 12/2018 | Nishikawa | B24B 9/00 |
| 2018/0371927 | A1 * | 12/2018 | Kuwamura | F01D 11/001 |

FOREIGN PATENT DOCUMENTS

| | | |
|---|---|---|
| JP | 3-288068 A | 12/1991 |
| JP | 2000-73702 A | 3/2000 |
| JP | 2006-138259 A | 6/2006 |
| JP | 2006-233787 A | 9/2006 |
| JP | 2011-80452 A | 4/2011 |
| JP | 2011-202601 A | 10/2011 |
| JP | 2012-72689 A | 4/2012 |
| JP | 2012-137006 A | 7/2012 |
| JP | 5518022 B2 | 6/2014 |
| JP | 2015-169077 A | 9/2015 |
| KR | 2013-0036346 A | 4/2013 |

OTHER PUBLICATIONS

Search Report dated Mar. 22, 2016, issued in counterpart International Application No. PCT/JP2015/085210 (9 pages).
International Preliminary Report on Patentability (Form PCT/IB/373) issued in counterpart International Application No. PCT/JP2015/085210 dated Aug. 10, 2017, with PCT/IB/338, PCT/IB/373, PCT/ISA/237, PCT/IB/326, with English translation (11 pages).

* cited by examiner

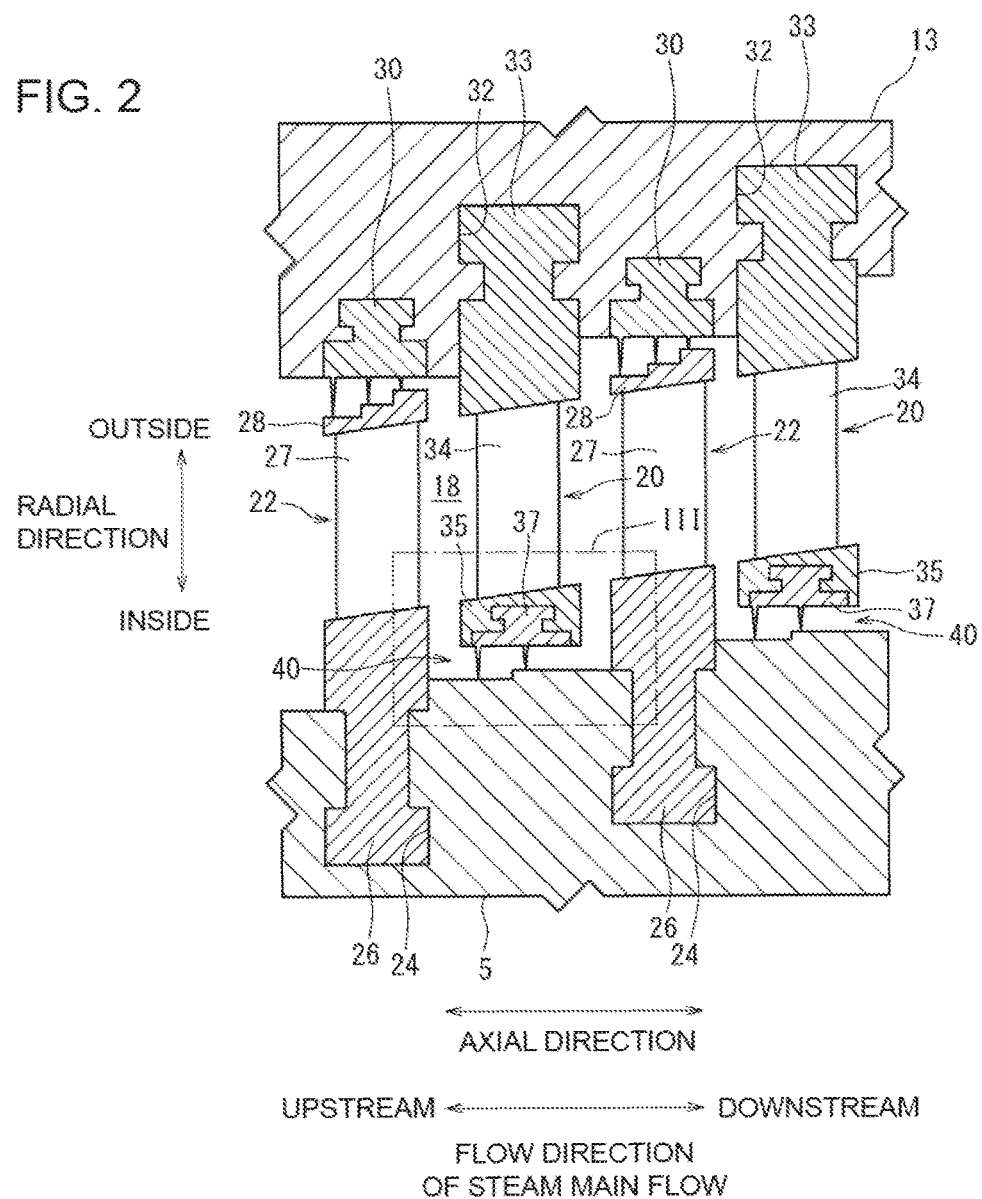

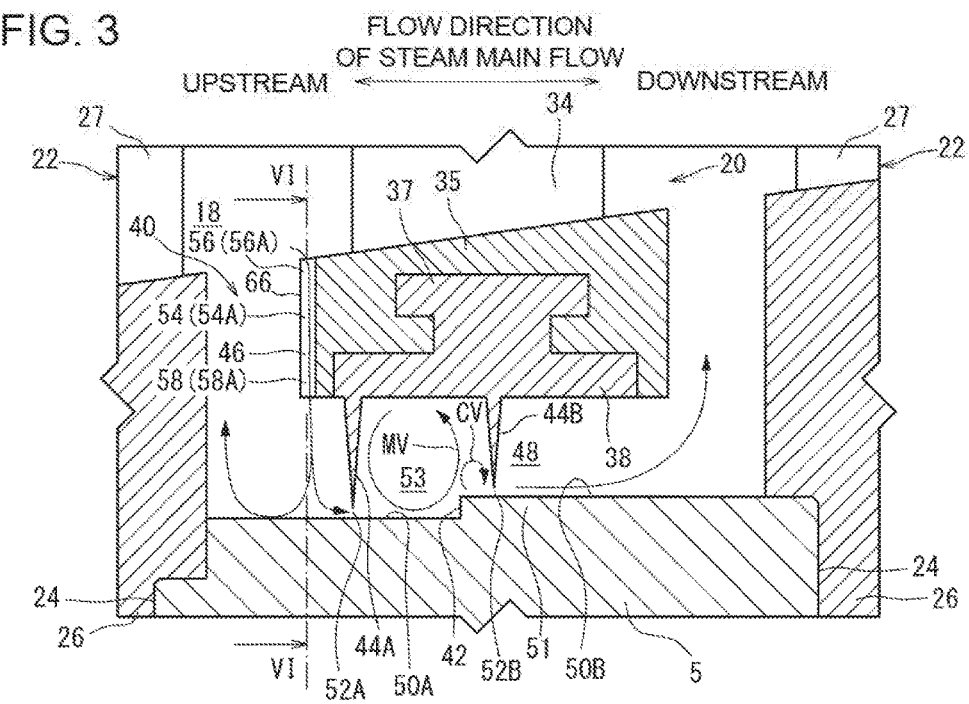
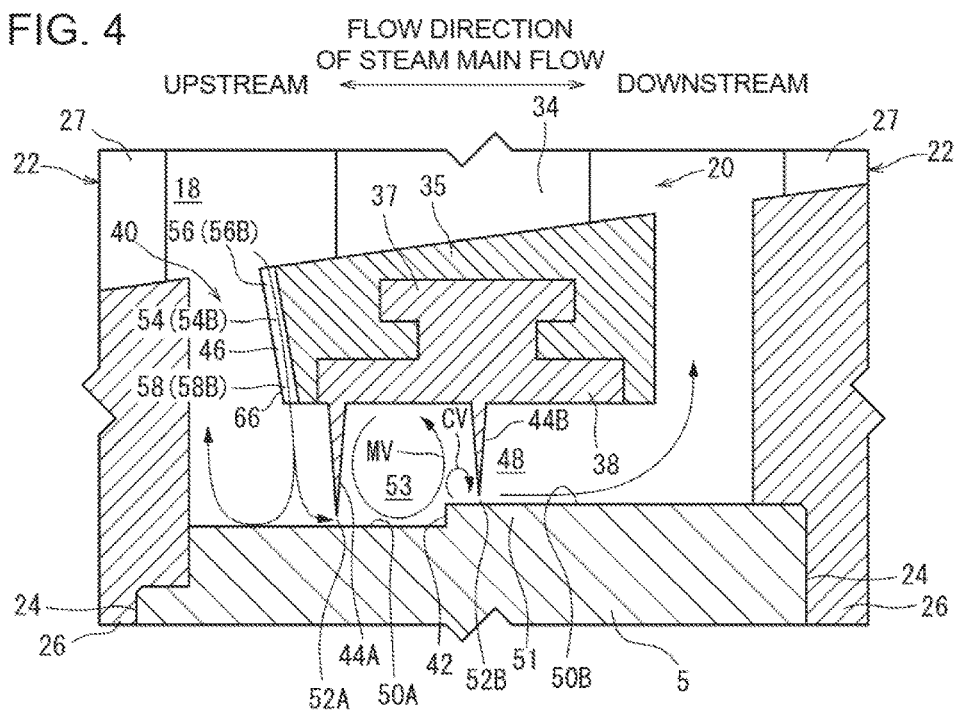

TURBINE

TECHNICAL FIELD

The present disclosure relates to a turbine.

BACKGROUND ART

Steam turbines and gas turbines are normally provided with a seal device capable of restricting a flow of a fluid in clearance between a stationary member and a rotational member, that is, for instance, clearance between rotor blades and members surrounding rotor blades or clearance between stationary vanes and a rotor.

For instance, JP5518022B discloses a seal device of a steam turbine provided with a step portion disposed on a tip portion of a blade and a seal fin disposed on a structural body. The step portion has at least one step surface facing the upstream side and protrudes toward the structural body. The seal fin extends toward the step portion and forms minute clearance between the seal fin and the step portion.

With the above seal device of a steam turbine, a separation vortex and a main vortex are formed on the upstream side of the seal tin, and the flow contraction effect of the separation vortex reduces leakage of steam that flows through the minute clearance.

SUMMARY

Problems to be Solved

An object of at least one embodiment of the present embodiment is to provide a turbine provided with an improved seal device capable of reducing a leakage flow better than a typical seal device.

Solution to the Problems

The present inventors conducted extensive researches to achieve the above object, and found that a min vortex and a separation vortex have the optimum vortex structure in a cavity between seal fins when a flow site of the cavity is uniform in the circumferential direction of a rotor. Further, the present inventors found that optimizing the vortex structure maximizes the strength of the separation vortex in the meridional plane, and, improves the sealing performance.

Furthermore, the present inventors found that, in reality, a velocity change (secondary flow) in the circumferential direction may occur in the cavity to reduce the kinetic energy of the fluid in the meridional plane, resulting in weaker main vortex and separation vortex than expectation. The center positions of the main vortex and the separation vortex may heave in the circumferential direction and the vortex structure may break. It was also found that the above tendency is stronger when the seal fins are inclined with respect to the radial direction of the rotor. Further, it was also found that the above tendency is stronger when the absolute circumferential velocity of the fluid flowing into the cavity is close to zero.

On the basis of the above findings, the present inventors conducted further researches, and found a configuration capable of forming a flow site in the cavity between the seal fins uniformly in the circumferential direction of the rotor, thus arriving at the present invention.

(1) A turbine according to at least one embodiment of the present invention comprises: a casing; a rotor extending inside the casing; a plurality of rotor blades fixed to the rotor and arranged in a circumferential direction of the rotor; a plurality of stationary vanes fixed to the casing and arranged in the circumferential direction of the rotor, each of the stationary vanes having a vane body and a shroud which is connected to the vane body and which faces an outer peripheral surface of the rotor via a clearance in a radial direction of the rotor; and a seal device capable of restricting a flow of a fluid in the clearance. The seal device comprises: at least one step surface disposed in a region of the outer peripheral surface of the rotor facing the shroud of the stationary vane in the radial direction of the rotor, the at least one step surface facing upstream in a flow direction of the fluid and dividing the region of the outer peripheral surface into at least two sections in an axial direction of the rotor; at least two seal tins protruding toward the at least two sections from the stationary vane and facing the at least two sections via a seal gap; and a swirling-component application portion disposed on an end side of the shroud of the stationary vane with respect to the axial direction, of the rotor and configured to be capable of applying a swirling component to the fluid flowing toward the seal gap.

With the turbine having the above configuration (1), a swirling component is applied to the flow of the fluid by the swirling-component application portion, and thereby the vortex structure is stabilized at the downstream side of the seal fin, so that an unstable secondary flow in the circumferential direction is suppressed, and the strength of the main vortex and the separation vortex improves in the meridional plane. As a result, it is possible to generate a down flow by the separation vortex efficiently, and thereby the flow rate of the fluid passing through the seal gap decreases and the seal performance improves.

(2) In some embodiments, in the above configuration (1), the swirling-component application portion comprises a plurality of grooves formed on the end side of the shroud and arranged in the circumferential direction of the rotor. Each of the plurality of grooves has an outer end portion disposed on an outer side in the radial direction of the rotor and an inner end portion disposed on an inner side in the radial direction of the rotor. At least the inner end portion of each of the plurality of grooves extends inclined with respect to the radial direction of the rotor.

With the above configuration (2), the inner end portion of the plurality of grooves formed on the shroud extends inclined with respect to the radial direction. Thus, with a simple configuration, a swirling component is applied to the fluid flowing through the inner end portion.

(3) In some embodiments, in the above configuration (2), in each of the plurality of grooves, the inner end portion is disposed in front of the outer end portion in a rotational direction of the rotor.

With the above configuration (3), the inner end portion of each of the plurality of grooves is disposed in front of the outer end portion in the rotational direction of the rotor, and thus it is possible to apply a swirling component in the same direction as the rotational direction of the rotor to the fluid flowing through the inner end portion. In this case, the direction of the swirling component is the same as the rotational direction of the rotor, and thus it is possible to reduce the friction loss between the rotor and the fluid.

(4) In some embodiments, in the above configuration (2) or (3), in each of the plurality of grooves, an inclination angle of the inner end portion with respect to the radial direction of the rotor is greater than an inclination angle of the outer end portion with respect to the radial direction of the rotor.

With the above configuration (4), the inclination angle of the outer end portion with respect to the radial direction of the rotor is smaller than the inclination angle of the inner end portion, and thus the fluid is likely to enter the outer end portion of the groove, and it is possible to reduce inflow loss. Furthermore, the inclination angle of the inner end portion with respect to the radial direction of the rotor is greater than the inclination angle of the outer end portion, and thus it is possible to apply a great swirling component to the fluid flowing through the groove. As a result, it is possible to apply a great swirling component to a greater amount of fluid, and the sealing performance improves even further.

(5) In some embodiments, in the above configuration (2) or (3), each of the plurality of grooves extends linearly and inclined with respect to the radial direction.

With the above configuration (5), the groove extends straight, and thus it is possible to form the groove easily.

(6) In some embodiments, in any one of the above configurations (2) to (4), each of the plurality of grooves extends curved so as to deviate gradually from the radial direction of the rotor from outside toward inside in the radial direction of the rotor.

With the above configuration (6), the grooves extend while curving so as to gradually deviate from the radial direction of the rotor from outside toward inside in the radial direction of the rotor, and thus it is possible to apply a great swirling component to the fluid flowing through the grooves.

(7) In some embodiments, in any one of the above configurations (2) to (6), each of the plurality of grooves has a constant width.

With the above configuration (7), the width of the grooves is constant, and thus it is possible to form the grooves easily.

(8) In some embodiments, in any one of the above configurations (2) to (6), each of the plurality of grooves has portions with different widths from one another.

With the above configuration (8), each groove has portions with different widths from one another, and thus it is possible to reduce loss in the groove while applying a swirling component to the fluid flowing through the groove.

(9) In some embodiments, in the above configuration (2), the plurality of grooves are formed by a plurality of blade portions formed on the end side of the shroud and arranged in the circumferential direction of the rotor.

With the above configuration (9), the plurality of grooves are formed by the blade portions, and thus it is possible to reduce loss in the grooves while applying a swirling component to the fluid flowing through the grooves.

(10) In some embodiments, in the above configuration (9), the blade portion has a leading edge portion disposed on an outer side in the radial direction of the rotor and a trailing edge portion disposed on an inner side in the radial direction of the rotor. The trailing edge portion is disposed in front of the leading edge portion in a rotational direction of the rotor.

With the above configuration (10), the trailing edge portion of the blade portion is disposed in front of the leading edge portion in the rotational direction of the rotor, and thus it is possible to apply a swirling component in the same direction as the rotational direction of the rotor to the fluid flowing through the blade portions. In this case, ith the direction of the swirling component being the same as the rotational direction of the rotor, it is possible to reduce the friction loss between the rotor and the fluid.

(11) In some embodiments, in the above configuration (9) or (10), the blade portion has a leading edge portion disposed on an outer side in the radial direction of the rotor and a trailing edge portion disposed on an inner side in the radial direction of the rotor. An inclination angle of the trailing edge portion with respect to the radial direction of the rotor is greater than an inclination angle of the leading edge portion with respect to the radial direction of the rotor.

With the above configuration (11), the inclination angle of the leading edge portion with respect to the radial direction of the rotor is smaller than the inclination angle of the trailing edge portion, and thus the fluid is likely to enter the outer end portion of the groove, and it is possible to reduce inflow loss. Furthermore, the inclination angle of the trailing edge portion with respect to the radial direction of the rotor is greater than the inclination angle of the leading edge portion, and thus it is possible to apply a great swirling component to the fluid flowing through the groove. As a result, it is possible to apply a great swirling component to a greater amount of fluid, and the sealing performance improves even further.

(12) In some embodiments, in any one of the above configurations (2) to (11), each of the plurality of grooves has portions with different depths from one another With the above configuration (12), each groove has portions with different depths from one another, and thereby it is possible to adjust the magnitude of the swirling component to be applied to the fluid.

(13) In some embodiments, in any one of the above configurations (1) to (12), an end surface of the end side of the shroud is inclined with respect to the radial direction of the rotor With the above configuration (13), the end surface of the end side of the shroud is inclined, and thereby it is possible to apply a greater swirling component to the fluid.

Advantageous Effects

According to at least one embodiment of the present embodiment, provided is a turbine provided with a seal device capable of reducing a leakage flow between the stationary vane and the rotor.

BRIEF DESCRIPTION OF DRAWINGS

FIG. 2 is an enlarged meridional cross-sectional view schematically showing a part of FIG. 1.

FIG. 3 is an enlarged meridional cross-sectional view schematically showing region III in FIG. 2.

FIG. 4 is a diagram of the turbine according to some embodiments, corresponding to FIG. 3.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "grave", "contain" and "constitute" are not intended to be exclusive of other components.

Figure 1:
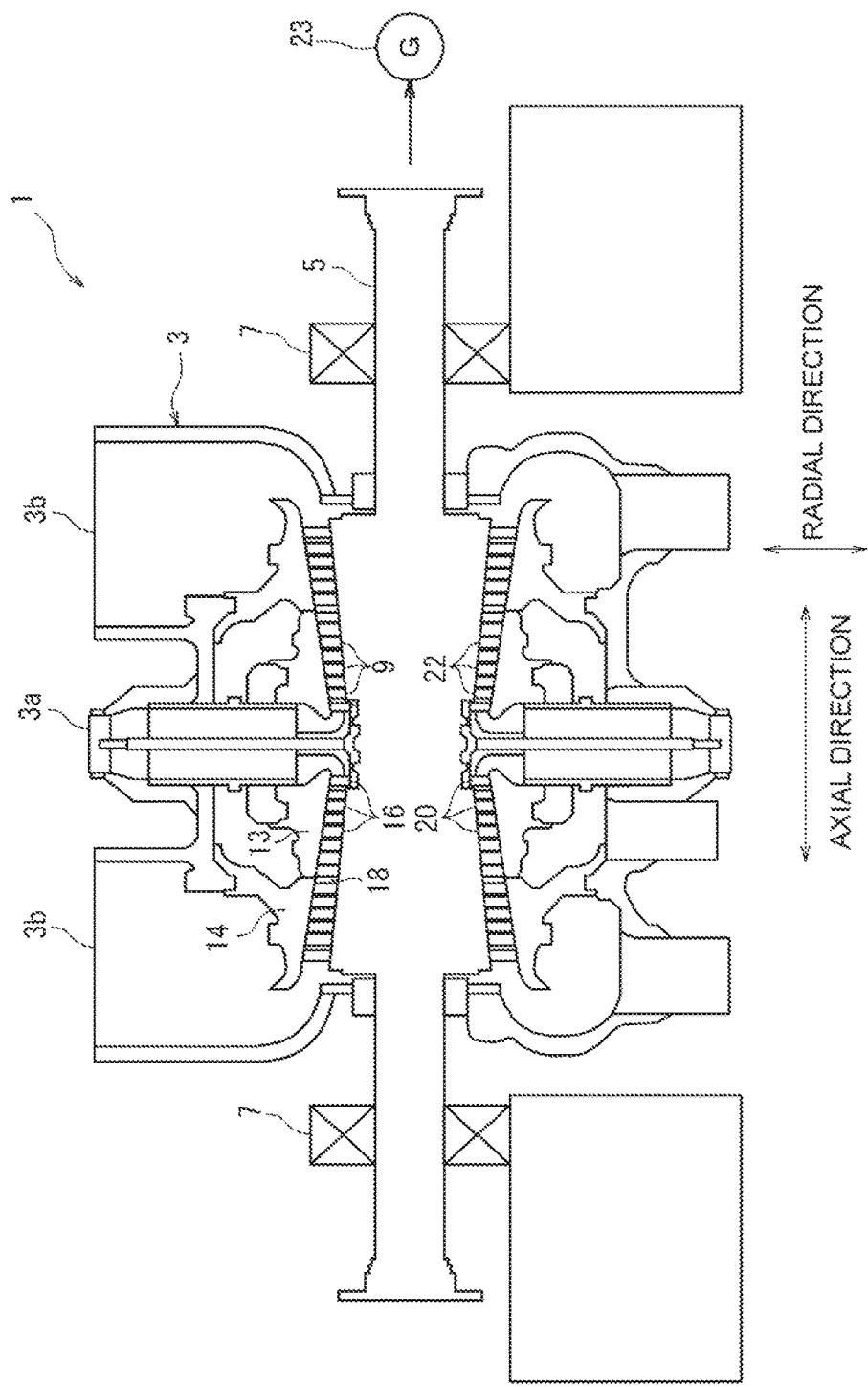
FIG. 1 is a schematic cross-sectional view of a configuration of a turbine according to an embodiment of the present invention.

FIG. 1 is a schematic cross-sectional view of a configuration of the turbine 1 according to an embodiment of the present invention. The turbine 1 is a mid-pressure steam turbine, including a casing 3 and a rotor 5. The casing 3 surrounds an intermediate portion of the rotor 5, and the opposite end portions of the rotor 5 are rotatably supported by a radial bearing 7.

The turbine 1 is an axial-flow turbine, and a plurality of rotor blade rows 9 are fixed to the rotor 5 at distance from one another in the axial direction of the rotor 5 (hereinafter, also referred to as merely axial direction). Furthermore, a plurality of stationary vane rows 16 are fixed to the casing 3 via blade rings 13, 14, at distance from one another in the axial direction.

An inner flow passage 18 having a cylindrical shape is formed between the blade rings 13, 14 and the rotor 5, and the stationary vane rows 16 and the rotor blade rows 9 are disposed in the inner flow passage 18. Each stationary vane row 16 includes a plurality of stationary vanes 20 arranged in the circumferential direction of the rotor 5 (hereinafter, also referred to as merely the circumferential direction), and each stationary vane 20 is fixed to the blade rings 13, 14. Each rotor blade row 9 includes a plurality of rotor blades (turbine rotor blades) 22 arranged in the circumferential direction, and each rotor blade 22 is fixed to the rotor 5. At each stationary vane row 16, the speed of the flow of steam is increased. At each rotor blade row 9, the energy of the steam is converted into rotational energy of the rotor 5. The rotor 5 is connected to a generator 23, for instance, and the generator 23 is driven by the rotor 5.

The casing 3 has a steam inlet 3a at the center in the axial direction, and two steam outlets 3b on both sides of the steam inlet 3a, the turbine 1 thus being a double-flow exhaust type turbine. Thus, inside the casing 3, two inner flow passages 18 are formed so as to extend in opposite directions from each other from the center with respect to the axial direction.

FIG. 2 is an enlarged meridional cross-sectional view schematically showing a part of FIG. 1. Specifically, FIG. 2 shows two stationary vanes 20, 20 that belong to different stationary vane rows 16, and two rotor blades 22, 22 disposed next to the stationary vanes 20, 20, along with the rotor 5 and the blade ring 13.

As shown in FIG. 2, blade grooves 24 extending in the circumferential direction are formed on the rotor 5. The rotor blade 22 has a blade root portion 25, a blade body (blade profile portion) 27, and a shroud (tip shroud portion) 28 formed integrally with one another. The blade root portion 26 is fitted into the blade groove 24, and the rotor blade 22 is fixed to the rotor 5. A seal member 30 is mounted to a section of the blade ring 13 that faces the shroud 28 of the rotor blade 22, and is capable of restricting a leakage flow in the clearance between the shroud 28 and the blade ring 13.

The rotor 5 and the rotor blades 22 may also be collectively referred to as a rotor assembly.

Further, as shown in FIG. 2, the blade ring 13 has a vane groove 32 extending in the circumferential direction. Furthermore, the stationary vane 20 has a vane root portion 33, a vane body (blade profile portion) 34, and a shroud (hub shroud portion) 35 formed integrally with one another. The vane root portion 33 is fitted into the vane groove 32, and thereby the stationary vane 20 is fixed to the blade ring 13, and to the casing 3 via the blade ring 13. A seal member 37 is mounted to the shroud 35 of the stationary vane 20 at the side of the rotor 5, and forms a part of a seal device 40 capable of restricting a leakage flow in the clearance between the shroud 35 and the rotor 5.

Figure 5:
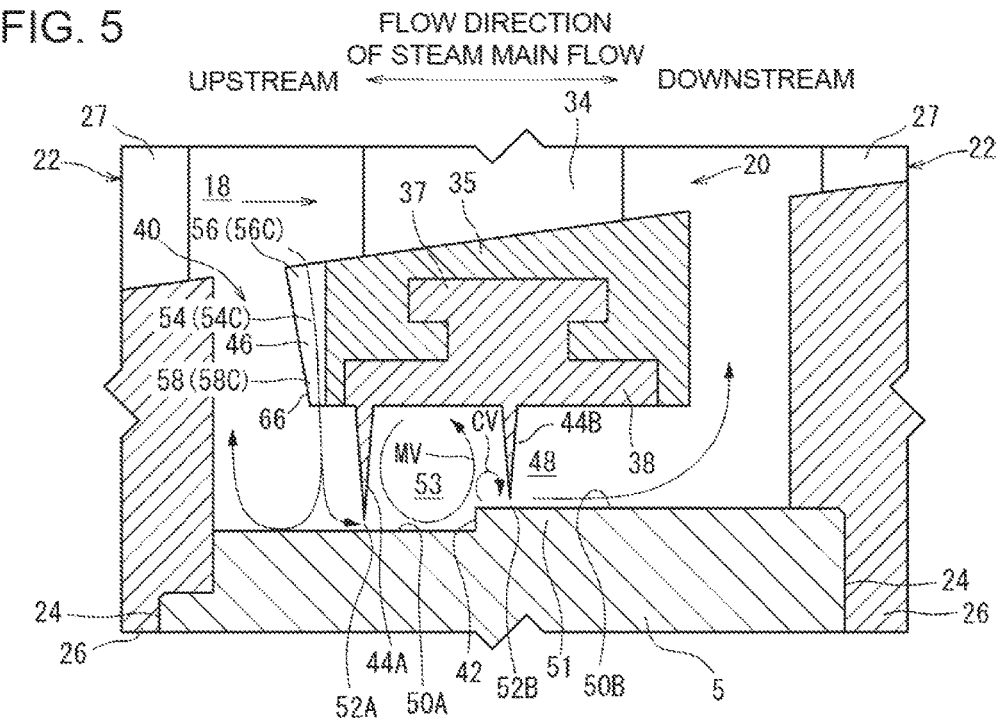
FIG. 5 is a diagram of the turbine according to some embodiments, corresponding to FIG. 3.
Figure 6:
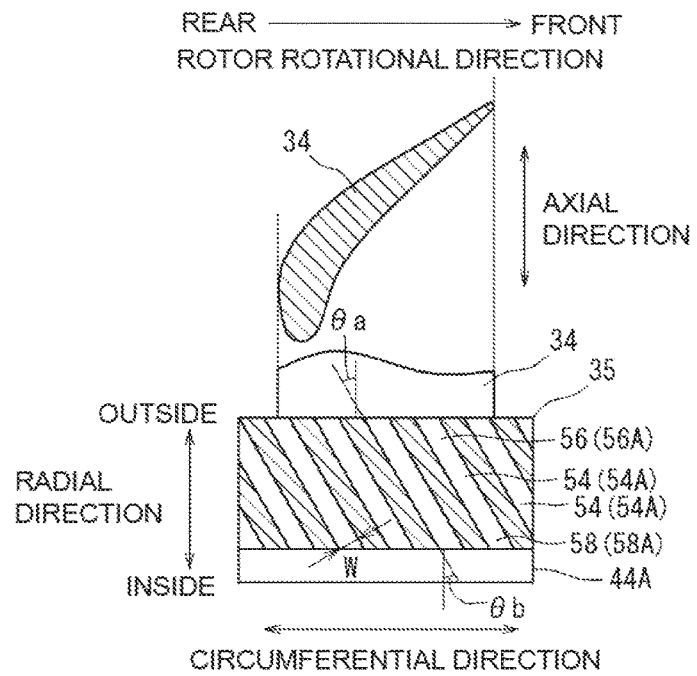
FIG. 6 is a schematic cross-sectional view of a shroud taken along line VI-VI in FIG. 3, shown with a traverse cross-sectional view of the vane body.
Figure 7:
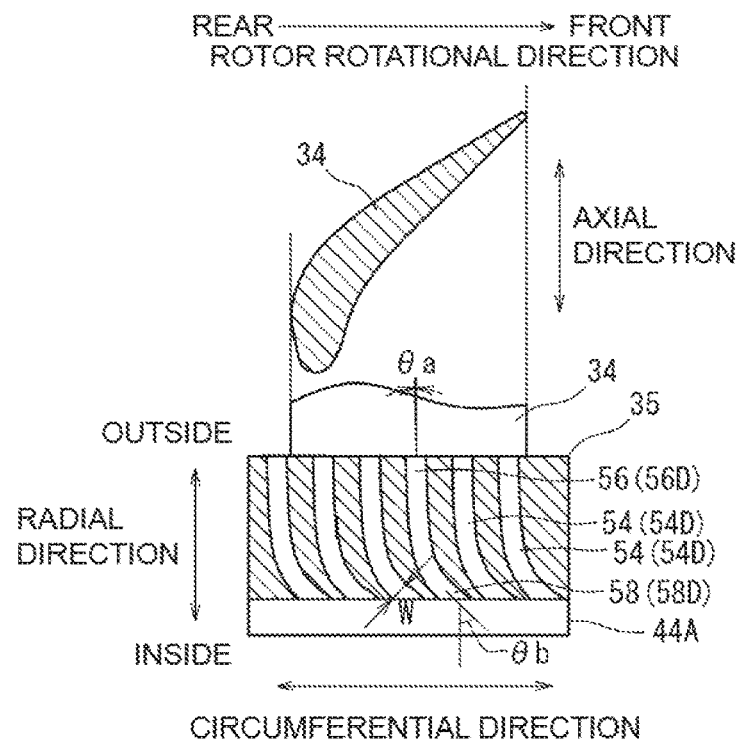
FIG. 7 is a diagram of the turbine according to some embodiments, corresponding to FIG. 6.
Figure 8:
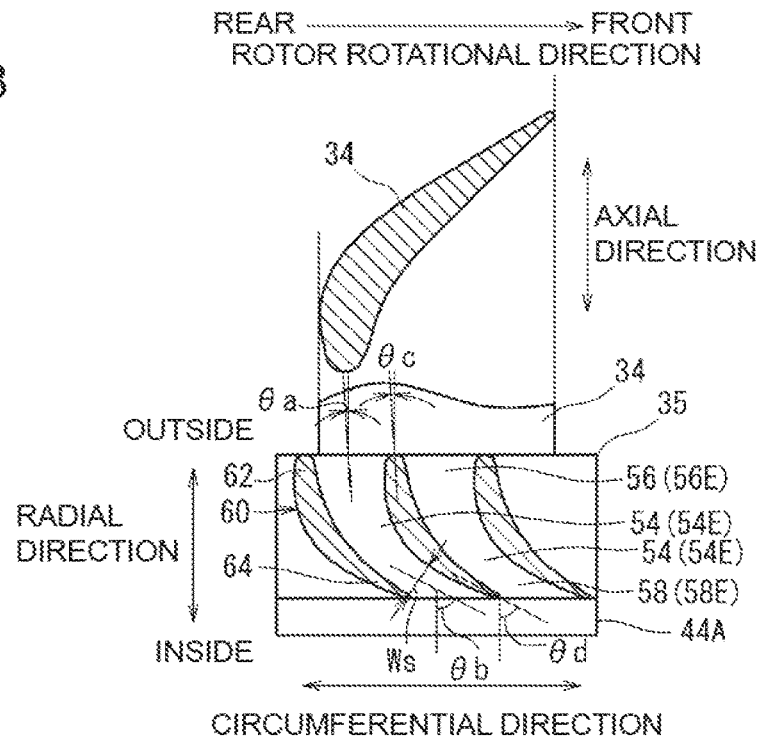
FIG. 8 is a diagram of the turbine according to some embodiments, corresponding to FIG. 6.

FIG. 3 is an enlarged meridional cross-sectional view schematically showing region III in FIG. 2. FIGS. 4 and 5 are diagrams of the turbine 1 according to some embodiments, corresponding to FIG. 3. FIG. 6 is a schematic cross-sectional view of a shroud 35 taken along line VI-VI in FIG. 3, shown with a traverse cross-section of the blade vane 34. FIGS. 7 and 8 are diagrams of the turbine 1 according to some embodiments, corresponding to FIG. 6.

As shown in FIGS. 3 to 5, the seal device 40 includes at least one step surface 42, at least two seal fins 44A, 44B, and a swirling-component application portion 46.

The step surface 42 is disposed in a region of the outer peripheral surface of the rotor 5 that faces the shroud 35 of the stationary vane 20 in the radial direction, and faces upstream in the flow direction of the fluid in the gap 48 between the shroud 35 and the outer peripheral surface of the rotor 5. The step surface 42 divides the region of the outer peripheral surface of the rotor 5 facing the shroud 35 into at least two sections 50A, 50B in the axial direction of the rotor 5. In other words, the sections 50A, 50B are connected via the step surface 42, and the section 50B disposed downstream in the flow direction of the fluid is disposed on the outer side, in the radial direction, of the upstream section 50A. The section 50B is formed by a step portion 51 having the step surface 42 and protruding in the radial direction from the section 50A.

The at least two seal fins 14A, 44B are disposed on the seal member 37 and have a fin shape. Specifically, the seal member 37 has a base portion 38 fixed to the shroud 35 so as to be flush, and the at least two seal fins 44A, 44B protrude from the base portion 38. While the seal member 37 is fixed to the shroud 35, the at least two seal fins 44A. 44B protrude toward the at least two respective sections 50A, 50B from the stationary vane 20, and face the at least two sections 50A, 50B via seal gaps 52A, 52B, respectively. The seal gap 52B is disposed away from the step surface 42 in the axial direction, and the cavity 53 between the seal fins 44A, 44B extends over the step surface 42 in the axial direction.

The swirling-component application portion 46 is disposed on an end side of the shroud 35 of the stationary vane 20 with respect to the axial direction of the rotor 5, and is capable of applying a swirling component to the fluid flowing toward the seal gap 52A.

In the above configuration, the cavity 53 between the seal fins 44A, 44B extends in the axial direction over the step surface 42, and thus a main vortex MV is formed on the upstream side and a separation vortex CV is formed on the downstream side, inside the cavity 53. With the above configuration, a swirling component is applied to the flow of the fluid by the swirling-component application portion 46, and thereby the vortex structure is stabilized at the downstream side of the seal fin 44A, that is, inside the cavity 53 between the seal fin 44A and the seal fin 44B, so that an unstable secondary flow in the circumferential direction is suppressed, and the strength of the main vortex MV and the separation vortex CV improves in the meridional plane. As a result, it is possible to generate a down flow by the separation vortex CV efficiently, and thereby the flow rate of the fluid passing through the seal gap 52B decreases and the seal performance improves.

hi some embodiments, as shown in FIGS. 3 to 8, the swirling-component application portion 46 comprises a plurality of grooves 54 formed on an end side of the shroud 35 and arranged in the circumferential direction of the rotor 5. Each of the plurality of grooves 54 has an outer end portion 56 disposed on the outer side in the radial direction and an inner end portion 58 disposed on the inner side in the radial direction. At least the inner end portions 58 of the plurality of grooves 54 extend inclined with respect to the radial direction.

With the above configuration, the inner end portions 58 of the plurality of grooves 54 formed on the shroud 35 extend inclined with respect to the radial direction. Thus, with a simple configuration, a swirling component is applied to the fluid flowing through the inner end portion 58.

In some embodiments, as shown in FIGS. 6 to 8, in each of the plurality of grooves 54, the inner end portion 58 is disposed in front of the outer end portion 56 in the rotational direction of the rotor 5 (hereinafter, also referred to as the rotational direction).

With the above configuration, the inner end portion 58 of each of the plurality of grooves 54 is disposed in front of the outer end portion 56 in the rotational direction, and thus it is possible to apply a swirling component in the same direction as the rotational direction to the fluid flowing through the inner end portion 58. In this case, the direction of the swirling, component is the same as the rotational direction of the rotor 5, and thus it is possible to reduce the friction loss between the rotor 5 and the fluid.

In some embodiments, as shown in FIGS. 7 and 8, in each of the plurality of grooves 54D, 54E, the inclination angle θb of the inner end portion 58D, 58E with respect to the radial direction of the rotor 5 is greater than the inclination angle θa of the outer end portion 56D, 56E with respect to the radial direction.

With the above configuration, the inclination angle θa of the outer end portion 56D, 56E with respect to the radial direction of the rotor 5 is smaller than the inclination angle θb of the inner end portion 58D, 58E, and thus the fluid is likely to enter the outer end portion 56D, 56E of the groove 54D, 54E, and it is possible to reduce inflow loss. Furthermore, the inclination angle θa of the inner end portion 58D, 58E with respect to the radial direction is greater than the inclination angle of the outer end portion 56D, 56E, and thus it is possible to apply a great swirling component to the fluid flowing through the groove 54. As a result, it is possible to apply a great swirling component to a greater amount of fluid, and the sealing performance improves even further.

In some embodiments, as shown in FIG. 6, each of the plurality of grooves 54A extends linearly and inclined with respect to the radial direction of the rotor 5.

With the above configuration, the grooves 54A extend straight, and thus it is possible to form the grooves 54A easily.

In some embodiments, as shown in FIGS. 7 and 8, each of the plurality of grooves 54D, 54E extends while curving so as to gradually deviate from the radial direction from outside toward inside in the radial direction of the rotor 5.

With the above configuration, the grooves 54D, 54E extend while curving so as to gradually deviate from the radial direction of the rotor 5 from outside toward inside in the radial direction of the rotor 5, and thus it is possible to apply a great swirling component to the fluid flowing through the grooves 54D, 54E.

In some embodiments, as shown in FIGS. 6 and 7, each of the plurality of grooves 54A, 54D has a constant width W.

With the above configuration, the width W of the grooves 54A, 54D is constant, and thus it is possible to form the grooves 54A, 54D easily.

hi some embodiments, as shown in FIG. 8, each of the plurality of grooves 54E has portions with different widths from one another.

With the above configuration, each groove 54E has portions with different widths from one another, and thus it is possible to reduce loss in the groove 54 while applying a swirling component to the fluid flowing through the groove 54.

In some embodiments, as shown in FIG. 8, each of the plurality of grooves 54E decreases gradually from outside toward inside in the radial direction of the rotor 5.

With the above configuration, the width of the plurality of grooves 54E gradually narrows, and thereby it is possible to increase the velocity of the fluid flowing through the grooves 54E, and to apply a stronger swirling component to the fluid flowing through the grooves 54E.

In some embodiments, as shown in FIG. 8, the plurality of grooves 54E are formed by a plurality of blade portions 60 formed on an end side of the shroud 35 and arranged in the circumferential direction of the rotor 5.

With the above configuration, the plurality of grooves 54 are formed by the blade portions 60, and thus it is possible to reduce loss in the grooves 54 while applying a swirling component to the fluid flowing through the grooves 54.

In some embodiments, as shown in FIG. 8, the width of each of the plurality of grooves 54E decreases gradually from outside toward inside in the radial direction of the rotor 5, and a throat portion disposed innermost in the radial direction has the minimum width Ws.

With the above configuration, the width of the plurality of grooves 54E gradually narrows and reaches its minimum at the throat portion, and thereby it is possible to increase the velocity of the fluid flowing through the grooves 54E, and to apply a stronger swirling component to the fluid flowing through the grooves 54E.

In some embodiments, as shown in FIG. 8, the blade portion 60 includes a leading edge portion 62 disposed on the outer side in the radial direction of the rotor 5, and a trailing edge portion 64 disposed on the inner side in the radial direction of the rotor 5. The trailing, edge portion 64 is disposed in front of the leading edge portion 62 in the rotational direction, of the rotor 5.

With the above configuration, the trailing edge portion 64 of the blade portion 60 is disposed in front of the leading edge portion 62 in the rotational direction of the rotor 5, and thus it is possible to apply a swirling component in the same direction as the rotational direction of the rotor 5 to the fluid flowing through the blade portions 60. In this case, the direction of the swirling component is the same as the rotational direction of the rotor 5, and thus it is possible to reduce the fiction loss between the rotor 5 and the fluid.

In some embodiments, as shown in FIG. 8, the inclination angle θd of the trailing edge portion 64 with respect to the radial direction of the rotor 5 is greater than the inclination angle θc of the leading edge portion 62 with respect to the radial direction of the rotor 5.

With the above configuration, the inclination angle θc of the leading edge portion 62 with respect to the radial direction of the rotor 5 is smaller than the inclination angle θd of the trailing edge portion 64, and thus the fluid is likely to enter the outer end portion 56E of the groove 54E, and it is possible to reduce inflow loss. Furthermore, the inclination angle θd of the trailing edge portion 64 with respect to the radial direction of the rotor 5 is greater than the inclination angle θc of the leading edge portion 62, and thus it is possible to apply a great swirling component to the fluid flowing through the grooves 54E. As a result, it is possible to apply a great swirling component to a greater amount of fluid, and the sealing performance improves even further.

In some embodiments, as shown in FIG. 8, the width of the trailing edge portion 64 of the blade portion 60 is smaller than the width of the leading edge portion 62.

With the above configuration, the width of the trailing edge portion 64 is small, and thereby wake is reduced, thus reducing inflow loss. As a result, it is possible to apply a great swirling component to the fluid, and the sealing performance improves even further.

In some embodiments, as shown in FIGS. 4 and 5, the end surface 66 on an end side of the shroud 35 is inclined with respect to the radial direction of the rotor 5.

With the above configuration, the end surface 66 of an end side of the shroud 35 is inclined, and thereby it is possible to apply a greater swirling component to the fluid.

In some embodiments, as shown in FIG. 5, each of the plurality of grooves 54C has portions with different depths from one another.

With the above configuration, each groove 54C has portions with different depths from one another, and thereby it is possible to adjust the magnitude of the swirling component to be applied to the fluid.

In some embodiments, as shown in FIGS. 3 to 5, an end side of the shroud 35 on which the grooves 54 are formed is disposed on the upstream side in the flow direction of the main flow. The grooves 54 extend through an end portion of the shroud 35 in the radial direction, and have openings on both sides of the shroud 35 in the radial direction.

Furthermore, in some embodiments, as shown in FIGS. 3 to 5, the groove 54 has an opening on the end surface 66 of the shroud 35.

Embodiments of the present invention were described in detail above, but the present invention is not limited thereto, and various amendments and modifications may be implemented.

For instance, the number of seal fins is not limited to two, and may be three or more. In accordance with this, the number of step surfaces may be two or more.

Furthermore, the shroud 35 is not limited to an integral shroud, and may be an inner ring constituting a part of a diaphragm. That is the turbine 1 is not limited to a reaction turbine, and may be an impulse turbine.

Further, for instance, the turbine 1 is not limited to a mid-pressure steam turbine, and may be a high-pressure or low-pressure steam turbine. The turbine 1 may be of a single flow type. Further, the turbine 1 may be a gas turbine, and its working fluid is not limited to steam. Furthermore, the above described seal device can be applied to any kind of rotary machine besides turbines, including compressors and shaft-end seals.

DESCRIPTION OF REFERENCE NUMERALS

1 Turbine
2 Casing
3a Steam inlet
3b Steam outlet
5 Rotor
7 Radial bearing
9 Rotor blade row
13 Blade ring
14 Blade ring
16 Stationary vane row
18 Inner flow passage
20 Stationary vane
22 Rotor blade
23 Generator
24 Blade groove
26 Blade root portion
27 Blade body (blade profile portion)
28 Shroud (tip shroud portion)
30 Seal member
32 Vane groove
33 Vane root portion
34 Vane (vane profile portion)
35 Shroud (hub shroud portion)
37 Seal member
38 Base portion
40 Seal device
42 Step surface
44A, 44B Fin seal
46 Swirling-component application portion
50A, 50B Section
51 Step portion
52A, 52B Seal gap
53 Cavity
54 (54A, 54B, 54C, 54D, 54E) Groove
56 (56A, 56B, 56C, 56D, 56E) Outer end portion
58 (58A, 58B, 58C, 58D, 58E) Inner end portion
60 Blade portion
62 Leading edge portion
64 Trailing edge portion
66 End surface
MV Main vortex
CV Separation vortex
θa, θb, θc, θd Inclination angle

The invention claimed is:

1. A turbine, comprising:
   a casing;
   a rotor extending inside the casing;
   a plurality of rotor blades fixed to the rotor and arranged in a circumferential direction of the rotor:
   a plurality of stationary vanes fixed to the casing and arranged in the circumferential direction of the rotor, each of the stationary vanes having a vane body and a shroud which is connected to the vane body and which faces an outer peripheral surface of the rotor via a clearance in a radial direction of the rotor; and
   a seal device capable of restricting a flow of a fluid iii the clearance,
   wherein the seal device comprises:

at least one step surface disposed in a region of the outer peripheral surface of the rotor facing the shroud of the stationary vane in the radial direction of the rotor, the at least one step surface facing upstream in a flow direction of the fluid and dividing the region of the outer peripheral surface into at least two sections in an axial direction of the rotor;

at least two seal fins protruding toward the at least two sections from the stationary vane and facing the at least two sections via a seal gap; and a swirling-component application portion disposed on an end side of the shroud of the stationary vane with respect to the axial direction of the rotor and configured to be capable of applying a swirling component to the fluid flowing toward the seal gap.

2. The turbine according to claim 1,
wherein the swirling-component application portion comprises a plurality of grooves formed on the end side of the shroud and arranged in the circumferential direction of the rotor,
wherein each of the plurality of grooves has an outer end portion disposed on an outer side in the radial direction of the rotor and an inner end portion disposed on an inner side in the radial direction of the rotor, and
wherein at least the inner end portion of each of the plurality of grooves extends inclined with respect to the radial direction of the rotor.

3. The turbine according to claim 2,
wherein, in each of the plurality of grooves, the inner end portion is disposed in front of the outer end portion in a rotational direction of the rotor.

4. The turbine according to claim 2,
wherein, in each of the plurality of grooves, an inclination angle of the inner end portion with respect to the radial direction of the rotor is greater than an inclination angle of the outer end portion with respect to the radial direction of the rotor.

5. The turbine according to claim 2,
wherein each of the plurality of grooves extends linearly and inclined with respect to the radial direction.

6. The turbine according to claim 2,
wherein each of the plurality of grooves extends curved so as to deviate gradually from the radial direction of the rotor from outside toward inside in the radial direction of the rotor.

7. The turbine according to claim 2,
wherein each of the plurality of grooves has a constant width.

8. The turbine according to claim 2,
wherein each of the plurality of grooves has portions with different widths from one another.

9. The turbine according to claim 2,
wherein the plurality of grooves are formed by a plurality of blade portions formed on the end side of the shroud and arranged M the circumferential direction of the rotor.

10. The turbine according to claim 9,
wherein the blade portion has a leading edge portion disposed on an outer side in the radial direction of the rotor, and a trailing edge portion disposed, on an inner side in the radial direction of the rotor, and
wherein the trailing edge portion is disposed in front of the leading edge portion in a rotational direction of the rotor.

11. The turbine according to claim 9,
wherein the blade portion has a leading edge portion disposed on an outer side in the radial direction of the rotor and a trailing edge portion disposed on an inner side in the radial direction of the rotor, and
wherein an inclination angle of the trailing edge portion with respect to the radial direction of the rotor is greater than an inclination angle of the leading edge portion with respect to the radial direction of the rotor.

12. The turbine according to claim 2,
wherein each of the plurality of grooves has portions with different depths from one another.

13. The turbine according to claim 1,
wherein an end surface of the end side of the shroud is inclined with respect to the radial direction of the rotor.

* * * * *